(12) United States Patent
Tanimoto et al.

(10) Patent No.: US 8,608,075 B2
(45) Date of Patent: Dec. 17, 2013

(54) CODE READING APPARATUS AND COMPUTER PROGRAM PRODUCT

(75) Inventors: Masanori Tanimoto, Hachioji (JP); Yasuaki Ogawa, Tachikawa (JP); Keiichi Tanioka, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 96 days.

(21) Appl. No.: 13/435,724

(22) Filed: Mar. 30, 2012

(65) Prior Publication Data

US 2012/0248192 A1 Oct. 4, 2012

(30) Foreign Application Priority Data

Mar. 31, 2011 (JP) ................................. 2011-077396

(51) Int. Cl.
 *G06K 7/10* (2006.01)
(52) U.S. Cl.
 USPC ............. 235/462.24; 235/462.23; 235/462.25
(58) Field of Classification Search
 USPC ............. 235/462.24, 462.25, 462.09, 462.23, 235/454
 See application file for complete search history.

(56) References Cited

U.S. PATENT DOCUMENTS

| 5,378,883 | A | 1/1995 | Batterman et al. |
| 7,201,318 | B2* | 4/2007 | Craen et al. ................... 235/454 |
| 2005/0006477 | A1* | 1/2005 | Patel ......................... 235/462.24 |
| 2006/0202038 | A1* | 9/2006 | Wang et al. .............. 235/462.24 |
| 2008/0245872 | A1* | 10/2008 | Good ......................... 235/462.24 |
| 2011/0220719 | A1* | 9/2011 | Ogawa et al. ................. 235/437 |

FOREIGN PATENT DOCUMENTS

JP 5-217013 A 8/1993
JP 2001-184452 A 7/2001

* cited by examiner

*Primary Examiner* — Daniel StCyr
(74) *Attorney, Agent, or Firm* — Holtz, Holtz, Goodman & Chick, PC (57) ABSTRACT

Disclosed is a code reading apparatus including a control section including: a first adjustment section repeating focus setting within a first execution time to execute first focus adjustment; a second adjustment section changing a focal position of a variable focal lens within a second execution time to execute second focus adjustment; a timer section counting a first execution number of the first focus adjustment and a second execution number of the second focus adjustment; and a time setting section setting the first execution time to be shortened starting from a predetermined first initial set time such that the first execution time is shortened as the first execution number increases, and setting the second execution time to be shortened starting from a predetermined second initial set time such that the second execution time is shortened as the second execution number increases.

11 Claims, 10 Drawing Sheets

CODE READING APPARATUS AND COMPUTER PROGRAM PRODUCT

BACKGROUND OF THE INVENTION

1. Field of the Invention

The present invention relates to a code reading apparatus and a computer program product.

2. Background Art

Conventionally, there is known a code reading apparatus which decodes a symbol such as a one-dimensional barcode or a two-dimensional code to obtain information. In the code reading apparatus, a two-dimensional imager device is installed. The two-dimensional imager device optically picks up (captures) an image of a symbol, and decodes the symbol by using the picked-up image data so as to obtain data.

In order to read a code by a code reading apparatus, it is necessary to execute focus processing to adjust the focal position of a lens optical system used for image pickup to a symbol as a reading subject. As the focus processing, there are known focus processing to change, using a fixed focal lens, a distance from the lens to a reading subject; and focus processing to change, using a variable focal lens, a focal position of the lens. As the focus processing using a fixed focal lens, for example, Japanese Patent Application Laid-Open Publication No. 2001-184452 discloses a technology with which a moving direction of a barcode symbol as a reading subject or a barcode reading apparatus is indicated by changing patterns of light emission or a sound, so that a user can promptly place the barcode symbol and the barcode reading apparatus at appropriate relative positions.

On the other hand, in a barcode reading apparatus using a variable focal lens, the focal position is adjusted by automatic focusing. As an autofocus method, for example, Japanese Patent Application Laid-Open Publication No. hei 05-217013 discloses a laser focus method which includes emitting a spotter beam of laser light to an optical axis of a lens at a predetermined angle, and measuring a distance to a reading subject based on a position of an image of the spotter beam (bright point) formed on a code plane, so as to execute focus adjustment of the lens. Furthermore, as another autofocus method, there is a method which includes picking up images of a symbol as a reading subject successively while changing focal positions in turn, and searching for a focused image based on a characteristic value (for example, a contrast value of an image) of each picked-up image data so as to identify the focal position, thereby executing focus adjustment of the lens (a contrast focus method or the like). The focus processing with the laser focus method can be executed taking a shorter period of time as compared with the focus processing with the contrast focus method. However, the contrast focus method is better than the laser focus method in the accuracy of automatic focusing.

Then, there is a barcode reading apparatus having an autofocus function using both the laser focus method and the contrast focus method installed therein. In the barcode reading apparatus, focus processing and decoding processing are repeated, each processing being executed for a predetermined period of time, until decoding succeeds with either of the autofocus methods. In addition, in such focus processing, the focal position is obtained asymptotically in general. Hence, a technology is used, the technology with which each time the focus processing is executed, a predetermined focus time is gradually reduced, so that unnecessary focus time is decreased, and the reading speed of code data becomes higher.

However, as described above, the laser focus method and the contrast focus method are different in time required for focus processing. Hence, decoding cannot be executed efficiently when a predetermined focus time is uniformly reduced each time the focus processing is executed.

SUMMARY OF THE INVENTION

An object of the present invention is to efficiently and accurately focus on a code symbol as a reading subject to read the code symbol.

According to a first aspect of the present invention, there is provided a code reading apparatus including: a variable focal lens; a focus drive section which adjusts a focal position of the variable focal lens; an image pickup section which obtains image data in an image pickup direction in which the variable focal lens faces; a light emitting section which emits a laser light beam in the image pickup direction; and a control section which controls an operation of each of the focus drive section, the image pickup section and the light emitting section so as to read a code symbol included in the obtained image data, the control section including: a first adjustment section which repeats, within a first execution time, focus setting to move the focal position based on coordinates of a bright point in the image data, the bright point being formed in a plane including the code symbol by the emitted laser light beam, so as to execute first focus adjustment; a second adjustment section which changes the focal position within a second execution time, and moves the focal position based on a magnitude of contrast calculated for each image data obtained by the image pickup section with each changed focal position, so as to execute second focus adjustment; a timer section which counts a first execution number of the first focus adjustment and a second execution number of the second focus adjustment; and a time setting section which sets the first execution time to be shortened starting from a predetermined first initial set time such that the first execution time is shortened as the first execution number increases, and sets the second execution time to be shortened starting from a predetermined second initial set time such that the second execution time is shortened as the second execution number increases.

According to a second aspect of the present invention, there is provided a computer program product having a command to execute computer processing encoded, the command readable by a computer of a code reading apparatus including: a variable focal lens; a focus drive section which adjusts a focal position of the variable focal lens; an image pickup section which obtains image data in an image pickup direction in which the variable focal lens faces; a light emitting section which emits a laser light beam in the image pickup direction; and a control section which controls an operation of each of the focus drive section, the image pickup section and the light emitting section so as to read a code symbol included in the obtained image data, the computer processing including: repeating, within a first execution time, focus setting to move the focal position based on coordinates of a bright point in the image data, the bright point being formed in a plane including the code symbol by the emitted laser light beam, so as to execute first focus adjustment; changing the focal position within a second execution time, and moving the focal position based on a magnitude of contrast calculated for each image data obtained by the image pickup section with each changed focal position, so as to execute second focus adjustment; counting a first execution number of the first focus adjustment and a second execution number of the second focus adjustment; and setting the first execution time to be shortened starting from a predetermined first initial set time such that the first execution time is shortened as the first execution number increases, and setting the second execution time to be shortened starting from a predetermined second initial set time such that the second execution time is shortened as the second execution number increases.

DETAILED DESCRIPTION OF THE PREFERRED EMBODIMENT

In the following, an embodiment of the present invention is described in detail with reference to the accompanying drawings.

Figure 1:
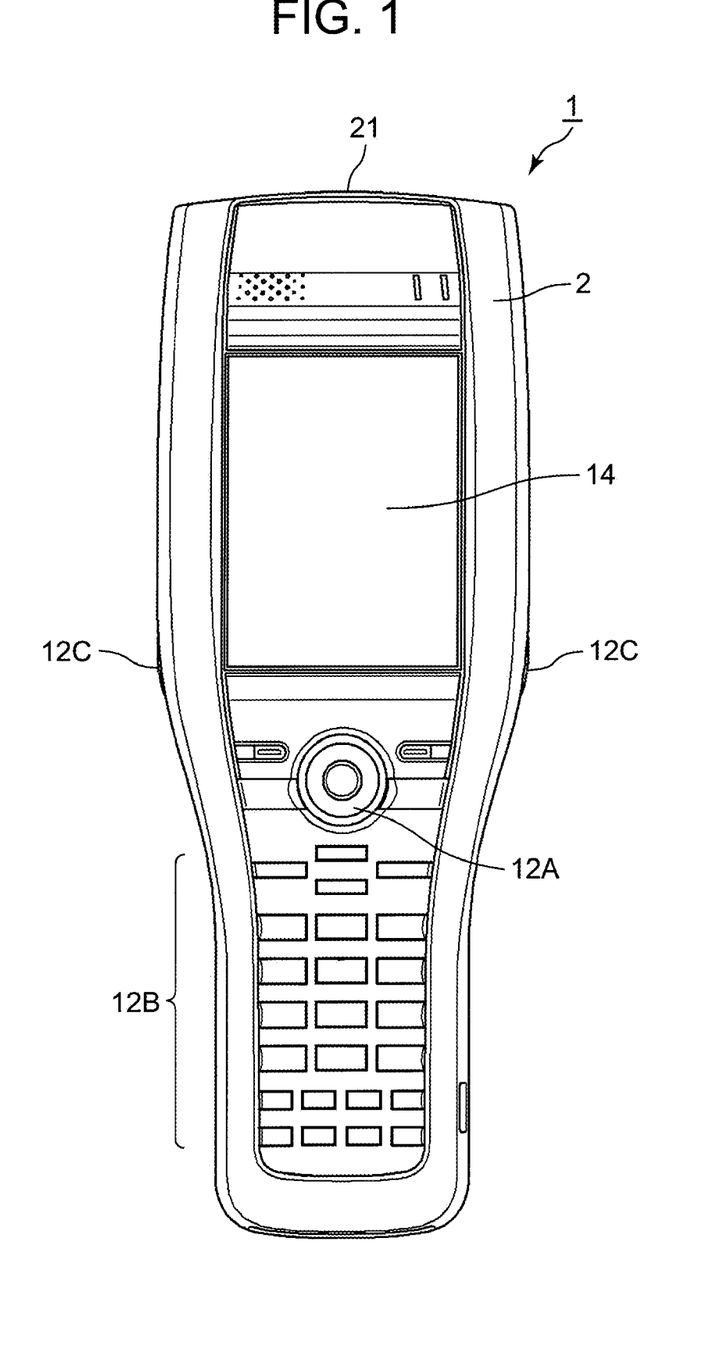
FIG. 1 is a front view of the overall configuration of a code reading apparatus in accordance with an embodiment of the present invention.

FIG. 1 is a front view of the overall configuration of a code reading apparatus in accordance with an embodiment of the present invention.

A code reading apparatus (computer) 1 in the embodiment is a portable device having a function to read a symbol such as a one-dimensional barcode or a two-dimensional code.

The code reading apparatus 1 includes a case 2. The code reading apparatus 1 has a trigger key 12A, various keys 12B and a display section 14 on the front face of the case 2, a trigger key 12C on the lateral face of the case 2, and an imager module 21 on the top end of the case 2.

The trigger keys 12A and 12C receive input of a start command to start an operation to read a symbol (symbol reading operation) executed by the imager module 21. The various keys 12B include: input keys to input numbers, letters or the like; and function keys, and receive input operations to input various pieces of information. The display section 14 displays information on a menu, a status and the like related to the input operations. The display section 14 also displays information on a status, a decoding result and the like when the symbol reading operation is executed by the imager module 21.

Figure 2:
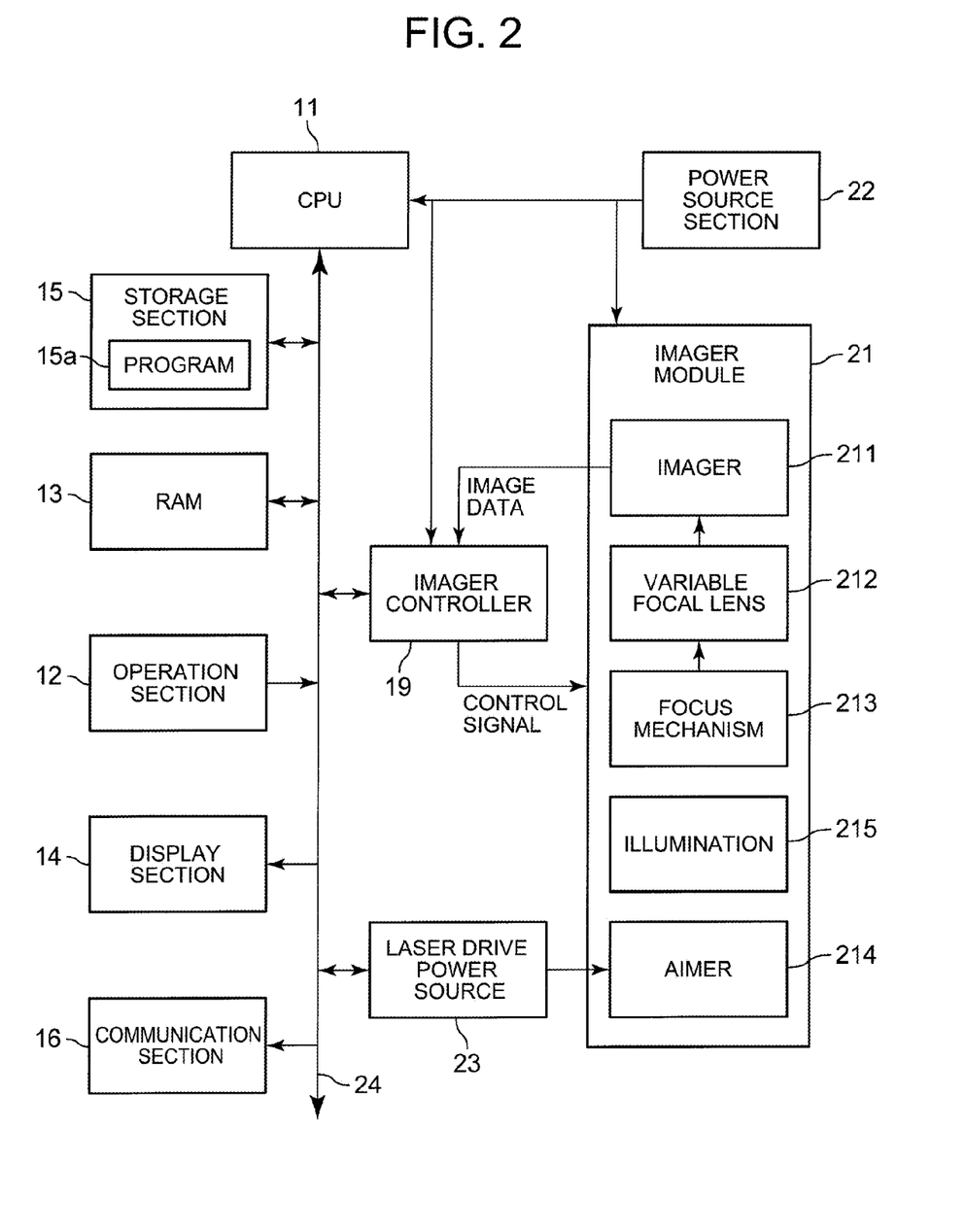
FIG. 2 is a block diagram showing the internal configuration of the code reading apparatus.

FIG. 2 is a block diagram showing the internal configuration of the code reading apparatus 1.

The code reading apparatus 1 includes a CPU (Central Processing Unit) 11 as a control section (a first adjustment section, a second adjustment section, and a timer section, a time setting section), an operation section 12, a RAM (Random Access Memory) 13, the display section 14, a storage section 15, a communication section 16, an imager controller 19, the imager module 21, a power source section 22, and a laser drive power source 23.

The above-described sections and the like of the code reading apparatus 1 except for the imager module 21 and the power source section 22 are connected with each other via a bus 24. The imager module 21 includes an imager 211 as an image pickup section, a variable focal lens 212, a focus mechanism 213 as a focus drive section which drives the variable focal lens 212 to adjust the focus thereof, an aimer 214 as a light emitting section, and an illumination 215 as an illuminating section.

The CPU 11 controls the sections and the like of the code reading apparatus 1. The CPU 11 reads various programs from the storage section 15 to load the programs into the RAM 13, and execute various types of processing in cooperation with the programs loaded into the RAM 13.

The operation section 12 includes the key set of the various keys 12B and the trigger keys 12A and 12C. The operation section 12 receives a press operation of each key of the key set, converts operation information on the press operation into an input signal, and outputs the signal to the CPU 11.

The RAM 13 is a volatile semiconductor memory, and provides a work memory space for the CPU 11. The RAM 13 is used for temporal storage of various data and for loading of various programs so that the programs are executed.

The display section 14 is constituted of an LCD (Liquid Crystal Display), an EL (Electro-Luminescent) display or the like, and displays various pieces of information in accordance with display information inputted from the CPU 11.

The storage section 15 is a nonvolatile read/write memory. For example, the storage section 15 is a flash memory. In the storage section 15, various programs and setting data are stored in advance. The storage section 15 may be an EEPROM (Electrically Erasable and Programmable Read Only Memory) or a hard disk. In a particular code reading apparatus, a ROM (Read Only Memory) may be used. The programs stored in the storage section 15 include a program 15a to control operations of the focus mechanism 213 such that a symbol is brought into focus and decoded. The CPU 11 loads the program 15a into the RAM 13 to execute decoding control processing described below.

The communication section 16 includes a communication antenna, a signal processing section, a modulation section and a demodulation section, and wirelessly communicates with an access point. The access point is a device to relay communications. That is, with the communication section 16, the code reading apparatus 1 communicates with an external apparatus such as a server apparatus via the access point, the external apparatus being connected to the access point. The communication section 16 processes a signal of transmission information with the signal processing section, and modulates the signal with the modulation section so as to wirelessly transmit the transmission information as a radio wave from the communication antenna to the access point. Furthermore, the communication section 16 receives a radio wave transmitted from the access point with the communication antenna, demodulates the radio wave with the demodulation section, and processes a signal thereof with the signal processing section so as to obtain reception information.

The communication section 16 may be a wireless communication section which executes wireless communications with the server apparatus via a station by a mobile phone communication system. Alternatively, the communication section 16 may be a wire communication section which executes wire communications with the server apparatus via a cradle where the code reading apparatus 1 is placed or a communication cable.

The imager controller 19 controls operations of components of the imager module 21, and controls data transmission/reception between the imager module 21 and other components of the code reading apparatus 1. The imager controller 19 is constituted of a semiconductor circuit such as an ASIC (Application Specific Integrated Circuit).

Into the imager controller 19, a frame synchronizing signal, a line synchronizing signal and a clock signal are inputted from the imager 211. The frame synchronizing signal indicates output timing of one frame of captured image data. The line synchronizing signal indicates output timing of one line of the image data. The clock signal indicates output timing of the image data. The imager controller 19 monitors transfer timing of image data to the RAM 13 based on the frame synchronizing signal, the line synchronizing signal and the clock signal. The imager controller 19 has a DMA (direct Memory Access) transfer function. With the DMA transfer function, the imager controller 19 directly transfers image data inputted from the imager 211 to the RAM 13 by DMA, namely, without the CPU 11.

The imager controller 19 controls operations of the focus mechanism 213 in accordance with the monitoring state of the image data transfer timing so as to change the focus of the variable focal lens 212 in real time.

The imager module 21 picks up an image of a symbol as a subject by adjusting the focal position of the variable focal lens 212. Although not particularly being limited, the imager 211 is a CMOS (Complementary Metal Oxide Semiconductor) image sensor. The imager 211 photoelectrically converts a subject image, which enters the imager 211 via an optical system including the variable focal lens 212, into an electric signal so as to capture (obtain) image data.

The imager 211 outputs, to the imager controller 19, image data for lines specified by an image region specification signal inputted from the imager controller 19 as line data one line by one line. Also, the imager 211 outputs the frame synchronizing signal, the line synchronizing signal and the clock signal to the imager controller 19. The variable focal lens 212 is, for example, a liquid lens, and an optical element which constitutes the optical system of the imager module 21. This liquid lens can change the focal position at high speed in accordance with a voltage being applied by the focus mechanism 213.

The focus mechanism 213 is the focus drive section which adjusts the focal position of the variable focal lens 212. When the variable focal lens 212 is a liquid lens, the focus mechanism 213 is an electric circuit including electrodes to apply a voltage to a predetermined part of the liquid lens. When a fixed lens such as glass or plastics is used as the variable focal lens 212, for example, a voice coil motor is used as the focus mechanism 213.

The aimer 214 is an LD (Laser Diode) which emits a laser light beam as spot light (target light). The spot light is a measurement indicator for a distance between the imager module 21 and a symbol as a subject, and a reference for making a direction in which the imager module 21 faces (image pickup direction) suitable to a direction in which a subject exists (subject direction). The illumination 215 is constituted of a light source such as an LED (Light Emitting Diode), and outputs irradiation light for illuminating a subject and an area around the subject (subject area).

The power source section 22 is constituted of a secondary battery or the like, and supplies electric power to each section or the like of the code reading apparatus 1. The laser drive power source 23 supplies electric power for driving the aimer 214 to emit the spot light. The laser drive power source 23 is disposed on a main substrate with the imager controller 19.

Figure 3:
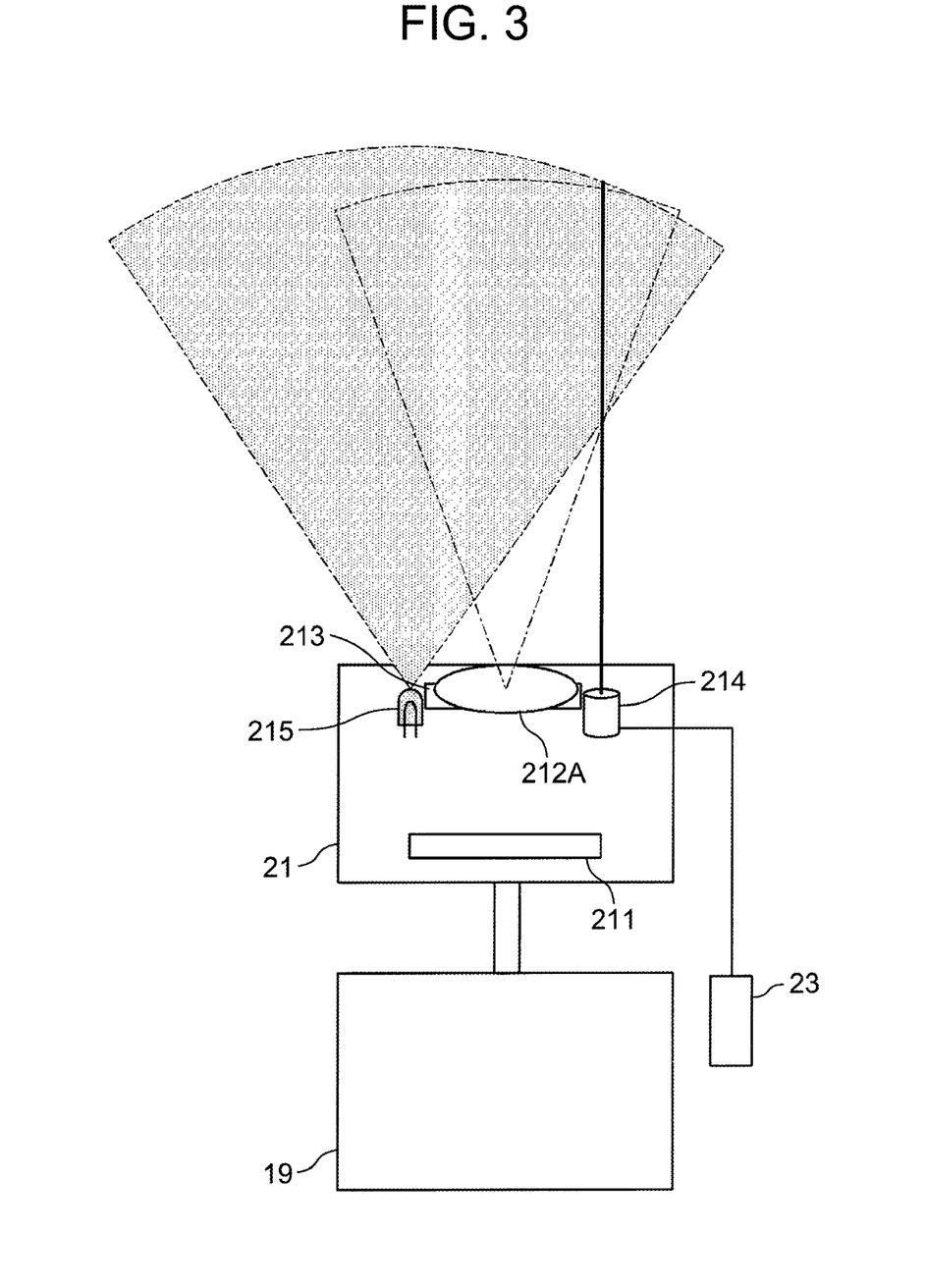
FIG. 3 is a plan view of an imager module and an imager controller of the code reading apparatus.

Next, disposition of the components of the imager module 21 is described in detail with reference to FIG. 3. FIG. 3 is a plan view of the imager module 21.

In the imager module 21, an optical system 212A including the variable focal lens 212 is disposed in such a way as to be able to pick up images of the outside of the imager module 21. The imager 211 is disposed perpendicularly to the optical axis of the optical system 212A. The aimer 214 and the illumination 215 are disposed almost in a line with the optical system 212A and the focus mechanism 213.

The aimer 214 is disposed in such a way that the laser light beam is included in an angle of view where the imager module 21 (the optical system 212A and the imager 211) can pick up an image (image pickup available extent), within the focal distance changeable with respect to the optical system 212A.

In the embodiment, the laser light beam is emitted in a direction parallel to the optical axis of the optical system 212A. The illumination 215 is disposed in such a way that the irradiation light, which illuminates an area in the shape of a fan, is included in the angle of view where the imager module 21 (the optical system 212A and the imager 211) can pick up an image (image pickup available extent), within the focal distance changeable with respect to the optical system 212A.

Next, focus adjustment methods of the optical system 212A are described.

Figure 4:
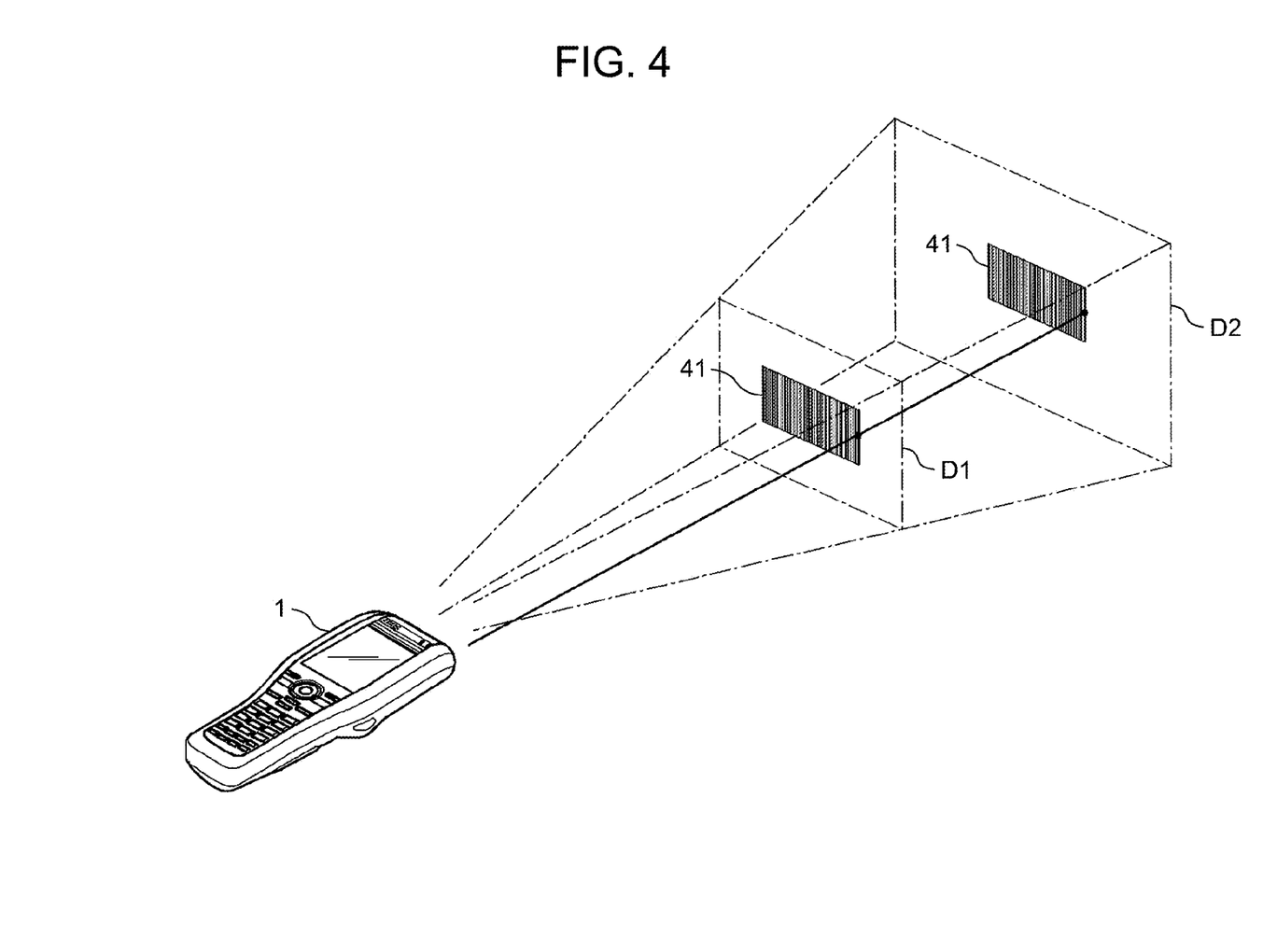
FIG. 4 shows that a symbol is disposed at a first position and a second position further than the first position.
Figure 5A:
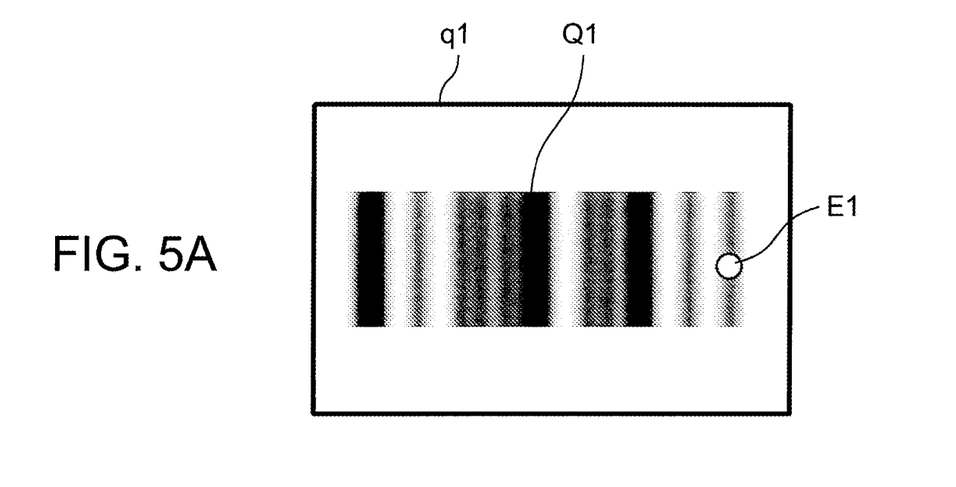
FIG. 5A shows a frame image obtained by picking up an image of the symbol disposed at the first position.
Figure 5B:
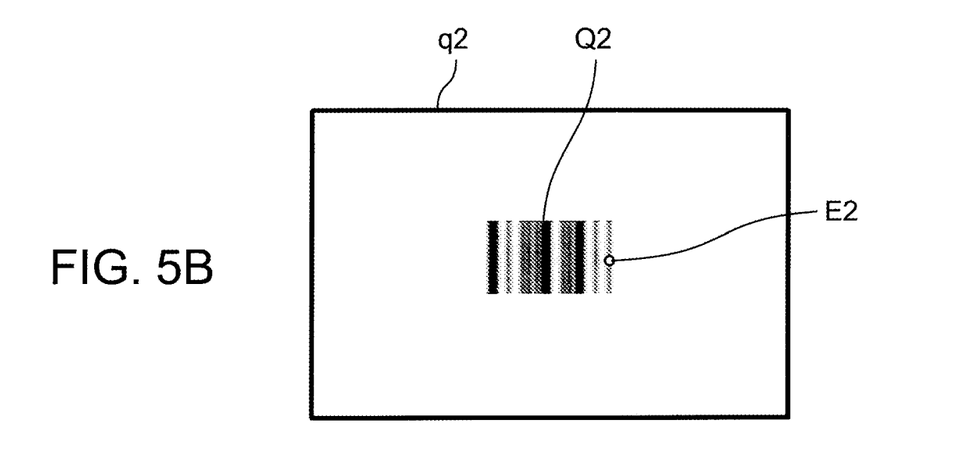
FIG. 5B shows a frame image obtained by picking up an image of the symbol disposed at the second position.

FIG. 4 shows that a symbol is disposed at a first position and a second position further than the first position. FIGS. 5A and 5B are frame images obtained by picking up images of the symbol disposed at the first position and the second position, respectively.

As shown in FIG. 4, when a plane on which a symbol 41 of a one-dimensional barcode is displayed is disposed at a first position D1, as shown in FIG. 5A, an image Q1 of the symbol 41 is obtained in a frame image q1. At the time, laser light is emitted from the aimer 214, and reaches the plane of the symbol 41, so as to form a bright point in the plane. In FIG. 5A, a bright point E1 is formed near the right end of the image Q1 of the symbol 41.

Although not particularly being limited, the barcode symbol 41 is printed, for example, on plain paper.

On the other hand, as also shown in FIG. 4, when a plane on which the symbol 41 is displayed is disposed at a second position D2 which is further than the first position D1 from the imager module 21, as shown in FIG. 5B, an image Q2 of the symbol 41 is obtained in a frame image q2. The area of the image Q2 of the symbol 41 in the area of the frame image q2 is relatively smaller than the area of the image Q1 of the symbol 41 in the area of the frame image q1. At the time, laser light is emitted from the aimer 214, and illuminates near the right end of the symbol 41. Then, the position of a bright point E2 in the frame image q2 is closer to the center of the frame image q2 as compared with the position of the bright point E1 in the frame image q1.

That is, in a frame image, an image pickup area obtained by the optical system 212A and the imager 211 with respect to a same subject (code symbol), the image pickup area where an image of the subject is picked up, becomes smaller approximately at the inverse square of the distance from the imager module 21 to the subject. Furthermore, in a frame image, the distance from the center thereof to the position of a bright point formed by the laser light becomes shorter approximately in inverse proportion to the distance from the imager module 21 to the subject (symbol 41), so that the bright point gradually gets closer to the center of the frame image. Consequently, the distance from the imager module 21 (liquid lens 212) to the symbol 41, namely, a target focal position to be set by the imager module 21 can be found from the position (coordinates) of a bright point in a frame image.

In the laser focus method, based on the above-described principle, the aimer 214 is lightened up (turned on) so that a frame image is obtained, the coordinates of a bright point in the frame image are identified, and the target focal position is found based on the coordinates of the bright point. At the time, if the position of the bright point formed by the laser light does not match the focal position of the variable focal lens 212, an image of the bright point becomes unclear. In such a case, by finding the centroid point of a detected light part, the coordinates of the center of the light part can be found.

Figure 6A:
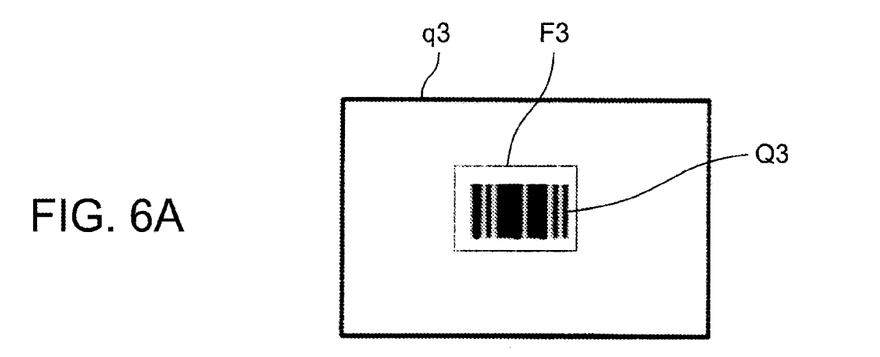
FIG. 6A is a frame image obtained by picking up an image of the symbol disposed at the second position when the focal position is equal to the first position.
Figure 6B:
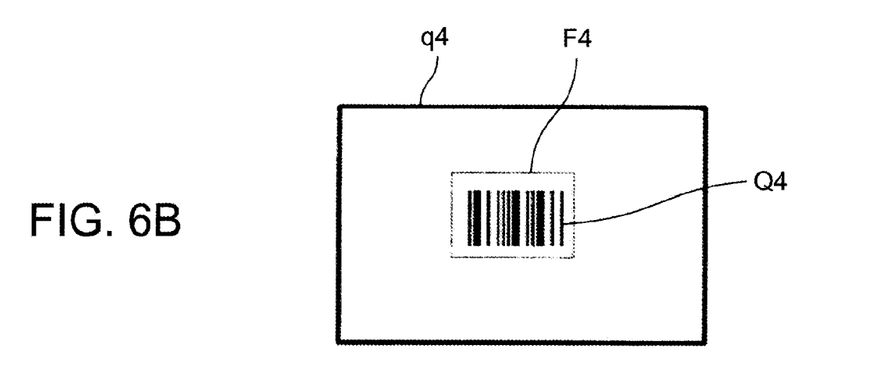
FIG. 6B is a frame image obtained by picking up an image of the symbol disposed at the second position when the focal position is equal to the second position.

FIG. 6A is a frame image obtained by picking up an image of the symbol disposed at the second position when the focal position of the variable focal lens 212 is equal to the first position. FIG. 6B is a frame image obtained by picking up an image of the symbol disposed at the second position when the focal position of the variable focal lens 212 is equal to the second position.

When the symbol 41 of a one-dimensional barcode is disposed at the second position D2 in FIG. 4, the image data obtained when the focal position of the imager module 21 is superposed on the second position D2 is the clearest. When the focal position thereof is in front or behind the second position D2, obtained image data is unclear.

For example, as shown in FIG. 6A, when the focal position of the imager module 21 is at the first position D1, the focal position is nearer to the imager module 21 as compared with the second position D2 where the symbol 41 is disposed. Consequently, a barcode image Q3 in a frame image q3 is unclear overall. As a result, in a predetermined region F3 including the barcode image Q3, the contrast between a space part which is a light part of the barcode symbol 41 and a bar part which is a dark part thereof becomes small.

On the other hand, as shown in FIG. 6B, when the focal position thereof is superposed on the second position D2, the outline of a barcode image Q4 in a frame image q4 is clear. Consequently, the light part and the dark part are separated. As a result, in a predetermined region F4 including the barcode image Q4, the contrast therebetween becomes large.

In the contrast focus method, by utilizing the above-described characteristics, the focal position to a barcode symbol is determined by obtaining frame image data while changing the focal position, calculating a contrast value of the contrast for each frame image, and selecting a focal position with which a local maximum contrast value is obtained.

Although not particularly being limited, as a calculated contrast value, for example, an MRD (Minimum Reflectance Difference) value is used. The MRD value is found from the difference between the minimum reflectance of the space part as the light part and the maximum reflectance of the bar part as the dark part. A contrast value is calculated by extracting data of the region F3 or F4 shown in FIG. 6A or 6B from its frame image data. The region F3 or F4 is set, for example, near the center of the frame image q3 or q4, so that the proportion of a region other than the barcode image Q3 or Q4 in the frame image q3 or q4 is reduced. It is not always necessary that the region F3 or F4 is set to include the entire barcode image Q3 or Q4.

Figure 6C:
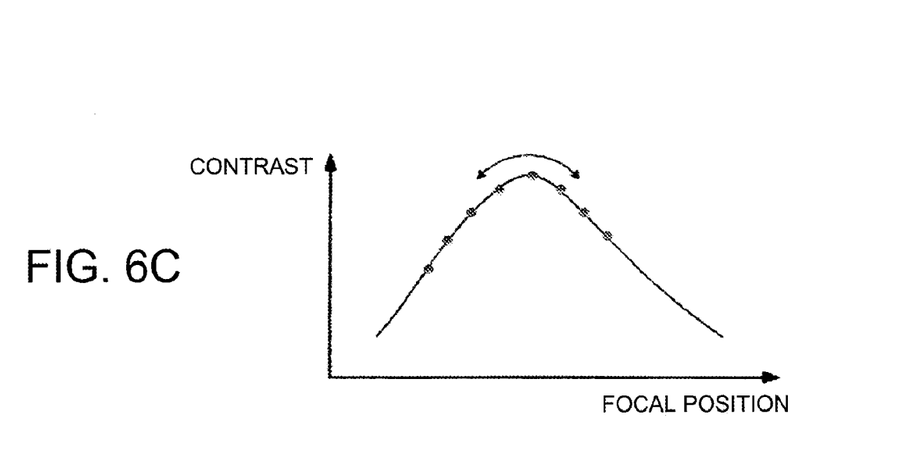
FIG. 6C is a graph showing change of contrast of the symbol for when the focal position is changed.

FIG. 6C shows an example of a change pattern of the contrast for when the focal position of the variable focal lens 212 is changed successively by the focus mechanism 213 in the imager module 21.

In the embodiment, frame images are obtained while the focal position is changed (moved) backward and/or forward, and a contrast value of a region set in each frame image is found successively. When a barcode image having a recognizable size exists in the set region in each obtained frame image, at some point, a found contrast value is the maximum contrast value (local maximum contrast value). The focal position with which the maximum contrast value is obtained is expected to be a position proximate to the position where the barcode symbol is disposed. Therefore, decoding of a barcode symbol is executed using picked-up image data obtained by adjusting the focal position of the variable focal lens 212 to the focal position with which the maximum contrast value is obtained, and picking up an image of the symbol with the focal position.

Next, steps of a focus adjustment operation and a barcode reading operation of the code reading apparatus 1 in the embodiment are described.

Figure 7:
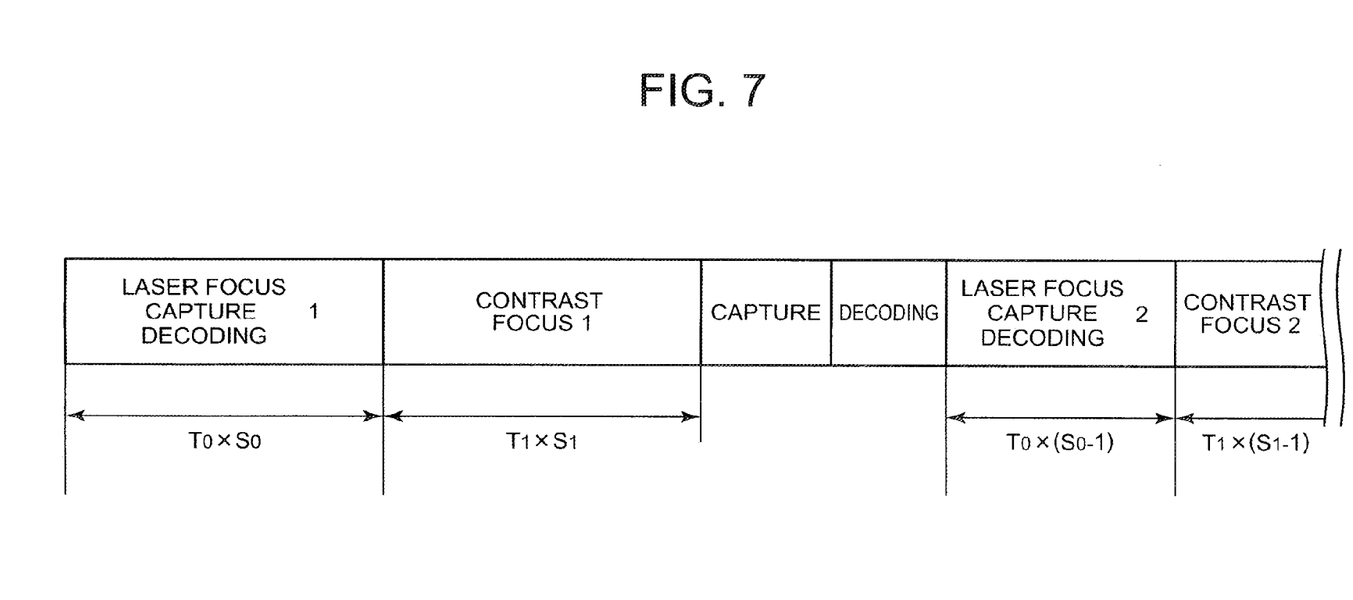
FIG. 7 schematically shows allotment of time in a barcode symbol reading operation in accordance with the embodiment.

FIG. 7 schematically shows allotment of time in the barcode reading operation.

In the barcode reading operation (decoding processing) in the embodiment, focus adjustment, frame image obtaining (capture), and symbol decoding by the laser focus method (altogether, laser focus processing, hereinbelow) and focus adjustment, frame image obtaining (capture), and symbol decoding by the contrast focus method (altogether, contrast focus processing, hereinbelow) are executed alternately for their respective execution times, which are set independently of each other, until decoding of a symbol image succeeds.

Even when a code other than a one-dimensional barcode, such as a two-dimensional code, is read, similar processing is executed.

According to the first-time laser focus processing, the focal position of the variable focal lens 212 is changed to a set position in a state in which the aimer 214 is turned on, and a frame image with the changed focal position (set position) is obtained. The obtained frame image is searched for a bright point formed by the beam of the aimer 214. When the bright point is recognized, the focal position is calculated based on the coordinates of the bright point in the frame image, and the focal position of the variable focal lens 212 is adjusted to the calculated value (laser focus (focus setting)).

The focal position is found by referring to a correspondence table stored in the storage section 15, the correspondence table showing correspondence between the coordinates of the bright point and the focal position. Alternatively, the focal position may be calculated based on a numerical formula.

Next, image pickup is executed in a state in which the aimer 214 is turned off with the found focal position so that image data is captured (capture). Then, the symbol included in the captured image is decoded (decoding). As a method for recognizing a symbol from image data to decode the symbol, various conventional technologies can be used. When decoding of the symbol is failed, the focus adjustment is executed by repeating a series of the above-described processing (laser focus, capture and decoding) within a set execution time $(T_0 \times S_0)$ (first execution time; first initial set time). The fixed number $T_0$ is a predetermined unit time for the laser focus (for example, the average time required for a series of laser focus, capture and decoding). The predetermined number $S_0$ is an integer indicating a set maximum number of times that the laser focus processing is executed.

When decoding of the symbol by the first-time laser focus processing is failed, the barcode reading operation is executed by the contrast focus processing. According to the contrast focus processing, frame images are obtained while the focal position of the variable focal lens 212 is changed within a predetermined range for a set execution time ($T_1 \times S_1$) (second execution time; second initial set time).

When a focal position is found by the laser focus in the laser focus processing which is executed right before this contrast focus processing, the predetermined range within which the focal position is changed is a range centering on the found focal position. When a focal position is not found yet, the predetermined range is set based on the initial set data stored in the storage section 15 beforehand.

The fixed number $T_1$ is a predetermined unit time for the focus adjustment (contrast focus) in the contrast focus processing (for example, time required when the focal position is changed for a predetermined maximum number of times (steps) in one focus adjustment). The predetermined number $S_1$ is an integer indicating a set maximum number of times that the contrast focus processing is executed. Next, a contrast value is calculated from data of a predetermined region of each obtained frame image, and the focal position of the variable focal lens 212 is moved to the focal position of the frame image, the focal position with which the maximum contrast value is obtained, whereby the focus adjustment is executed (contrast focus).

Thereafter, image pickup is executed with the focal position (capture), and the symbol included in the captured frame image is decoded (decoding).

When decoding of the symbol by the first-time contrast focus processing is failed, the second-time laser focus processing is executed. The contents of the second-time laser focus processing are different from the contents of the first-time laser focus processing in the following two points.

(1) In the case where the maximum contrast value is obtained by the contrast focus processing, detection of the position of the bright point formed by the light emitted from the aimer 214 and calculation of the focal position start from the focal position where the contrast value is obtained.

(2) The execution time for the laser focus processing is changed to $T_0 \times (S_0 - 1)$.

That is, in the second-time laser focus processing and thereafter, data of the focal position obtained by its previous laser focus processing and/or contrast focus processing is used, so that only a limited range is searched for the focal position. Accordingly, the focal position is re-found within a shorter execution time.

If decoding of the symbol still does not succeed even after the laser focus processing is executed $S_0$ times while an execution time Ta (first execution time) for the $N^{th}$-time laser focus processing is shortened to $T_0 \times (S_0 - N + 1)$, the laser focus processing is up. In the laser focus processing of the embodiment, when a predetermined time is reduced, for example, the number of times that a processing loop of the laser focus, capture, and decoding is executed in one laser focus processing is decreased, the loop being repeated in one laser focus processing.

The second-time contrast focus processing and thereafter are executed in the same way as the first-time contrast focus processing. That is, in the $M^{th}$-time contrast focus processing, contrast values are obtained with focal positions. The focal positions are set within a predetermined range centering on the focal position found by the latest laser focus processing or contrast focus processing executed right before the $M^{th}$-time contrast focus processing. Then, among the focal positions, a focal position where the maximum contrast value is obtained is selected so that the symbol is decoded. An execution time Tb (second execution time) set for the focus adjustment of the $M^{th}$-time contrast focus processing is $T_1 \times (S_1 - M + 1)$.

If decoding of the code (symbol) still does not succeed after the contrast focus processing is executed $S_1$ times, the contrast focus processing is up. In the contrast focus processing, when a predetermined time is reduced, for example, the number of times (steps) that the focal position is changed in one focus adjustment is decreased.

Thus, the laser focus processing execution number and the contrast focus processing execution number are independently managed. Furthermore, even if one of the laser focus processing and the contrast focus processing is up, the other continues until the other is up. On the other hand, when decoding of the symbol succeeds by one of the laser focus processing and the contrast focus processing, the decoding processing ends at the time.

Next, with respect to the barcode reading operation, steps of control processing executed by the CPU 11 are described.

Figure 8:
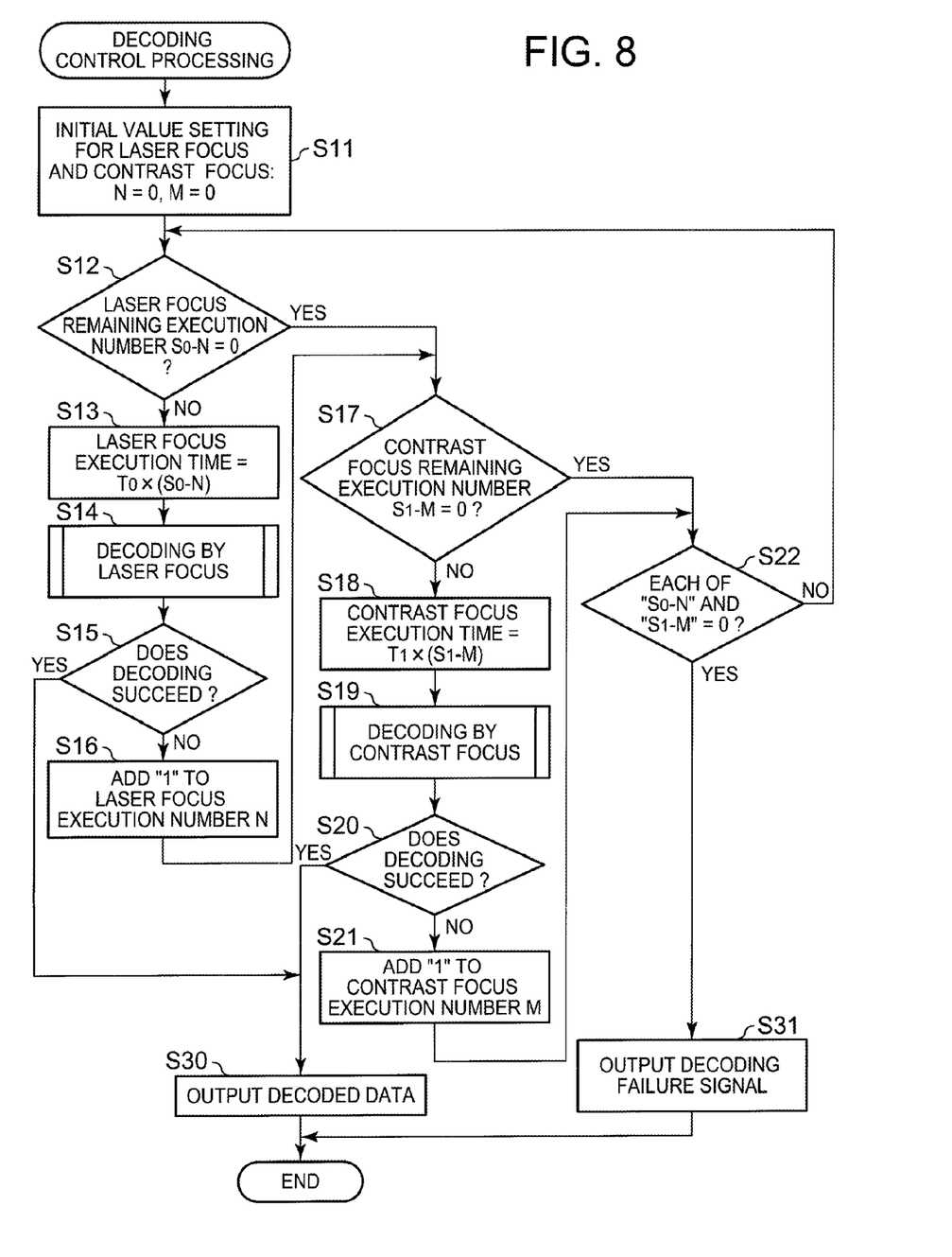
FIG. 8 is a flowchart showing control steps of decoding processing (decoding control processing) in accordance with the embodiment.

FIG. 8 is a flowchart showing control steps of the decoding processing (decoding control processing).

The decoding control processing executed by the CPU 11 starts after the CPU 11 loads the program 15a read from the storage section 15 to the RAM 13 based on an input signal corresponding to a user's operation of the operation section 12.

The CPU 11 sets the initial values for the laser focus processing and the initial values for the contrast focus processing (Step S11). More specifically, as the initial values for the focus adjustment by the laser focus method, the CPU 11 sets the maximum execution number of the laser focus processing $S_0$, the number of times that the laser focus processing has been executed (execution/executed number N) to "0", and the initial focal position where the focus adjustment in the first-time laser focus processing is executed. In addition, as the initial values for the contrast focus processing, the CPU 11 sets the maximum execution number of the contrast focus processing $S_1$, and the number of times that the contrast focus processing has been executed (execution/executed number N) to "0". The CPU 11 also sets the number of changes/steps (change number) of the focal position and a change/step interval of the focal position for the focus adjustment in the first-time contrast focus processing. It is not necessary that the maximum execution numbers $S_0$ and $S_1$ are the same.

Next, the CPU 11 judges whether or not the remaining execution number ($S_0 - N$) for the laser focus processing is "0" (Step S12). When it is judged that the remaining execution number ($S_0 - N$) is "0" (Step S12; YES), the CPU 11 moves the processing to Step S17. When it is judged that the remaining execution number ($S_0 - N$) is not "0" (Step S12; NO), the CPU 11 moves the processing to Step S13.

At Step S13, the CPU 11 sets the execution time for laser focus processing Ta to $T_0 \times (S_0 - N)$. Then, the CPU 11 executes the laser focus control processing (Step S14). The laser focus control processing at Step S14 is described below in detail. Then, the CPU 11 judges whether or not decoding of a barcode symbol succeeds (Step S15). When it is judged that decoding thereof succeeds (Step S15; YES), the CPU 11 moves the processing to Step S30. When it is judged that decoding thereof does not succeed (Step S15; NO), the CPU 11 adds "1" to the laser focus processing execution number N (Step S16). Then, the CPU 11 moves processing to Step S17.

At Step S17, the CPU 11 judges whether or not the remaining execution number ($S_1 - M$) for the contrast focus processing is "0". When it is judged that the remaining execution number ($S_1-M$) is "0" (Step S17; YES), the CPU 11 moves the processing to Step S22. When it is judged that the remaining execution number ($S_1-M$) is not "0" (Step S17; NO), the CPU 11 sets the execution time Ta for the focus adjustment of the contrast focus processing to $T_1 \times (S_1-M)$. Then, the CPU 11 executes the contrast focus control processing (Step S19). The contrast focus control processing at Step S19 is described below in detail.

Next, the CPU 11 judges whether or not decoding of the barcode symbol by the contrast focus processing succeeds (Step S20). When it is judged that decoding thereof succeeds (Step S20; YES), the CPU 11 moves the processing to Step S30. When it is judged that decoding thereof does not succeed (Step S20; NO), the CPU 11 adds "1" to the contrast focus processing execution number M (Step S21). Then, the CPU 11 moves the processing to Step S22.

At Step S22, the CPU 11 judges whether or not both the remaining execution number ($S_0-N$) for the laser focus processing and the remaining execution number ($S_1-M$) for the contrast focus processing are "0". When it is judged that both of them are "0" (Step S22; YES), the CPU 11 moves the processing to Step S31. When it is judged that at least one of them is not "0" (Step S22; NO), the CPU 11 returns the processing to Step S12, and executes the second-time (or thereafter) laser focus control processing.

At Step S30, the CPU 11 outputs the decoded data indicating failure of decoding, and ends the decoding control processing.

At Step S31, the CPU 11 outputs a decoding failure signal, and ends the decoding control processing.

Figure 9:
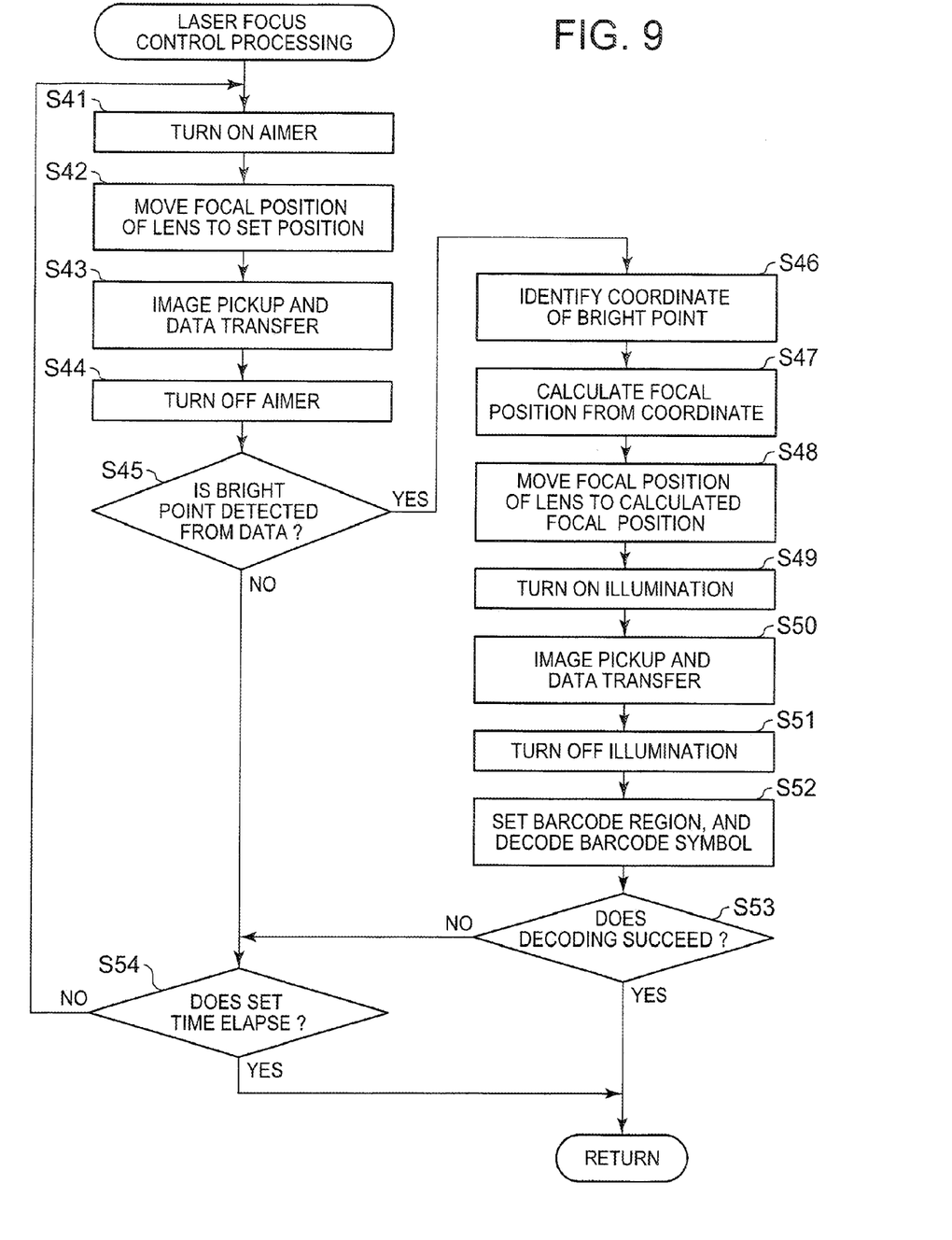
FIG. 9 is a flowchart showing control steps of decoding processing using a laser focus method (laser focus control processing) in the decoding control processing.

FIG. 9 is a flowchart showing control steps of the laser focus processing (laser focus control processing) called and executed at Step S14.

When the laser focus control processing starts, the CPU 11 transmits a command to the laser drive power source 23 and the imager controller 19 to light up (turn on) the aimer 214 (Step S41). At the time, the CPU 11 starts counting time elapsed from the start of the laser focus control processing. The CPU 11 transmits a command to the imager controller 19 to operate the focus mechanism 213 to move the focal position of the variable focal lens 212 to a set position (Step S42).

The CPU 11 transmits a command to the imager controller 19 to make the imager 211 pick up an image, and to make the imager controller 19 transfer the picked-up image data, which is transmitted from the imager 211 to the imager controller 19, directly to the RAM 13 by DMA (Step S43). It is possible to select, of the picked-up image data, only data of an area in which the bright point can appear by the light emitted from the aimer 214, as data to be transferred to the RAM 13. Then, the CPU 11 transmits a command to the laser drive power source 23 and the imager controller 19 to turn off the aimer 214 (Step S44).

Thereafter, the CPU 11 analyzes the picked-up image data transferred to the RAM 13, and judges whether or not the bright point formed by the light emitted from the aimer 214 is detected in the data (Step S45). When it is judged that the bright point formed by the light emitted from the aimer 214 is not detected (Step S45; NO), the CPU 11 moves the processing to Step S54.

On the other hand, when it is judged that the bright point formed by the light emitted from the aimer 214 is detected (Step S45; YES), the CPU 11 identifies the coordinates of the bright point in its frame image (Step S46). Then, the CPU 11 calculates a focal position based on the coordinates of the bright point (step S47).

Next, the CPU 11 transmits a command to the imager controller 19 to operate the focus mechanism 213 to move the focal position of the variable focal lens 212 to the calculated focal position (Step S48). More specifically, the CPU 11 makes the focus mechanism 213 apply an applied voltage for the calculated focal position based on a correspondence table stored in the storage section to the variable focal lens 212, the correspondence table showing correspondence between the focal position and the applied voltage.

The CPU 11 transmits a command to the imager controller 19, first, to turn on the illumination 215 (Step S49), and then to make the imager 211 pick up an image, and also to make the imager controller 19 transfer the picked-up image data, which is transmitted from the imager 211 to the imager controller 19, to the RAM 13 by DMA (Step S50). Then, the CPU 11 transmits a command to the imager controller 19 to turn off the illumination 215 (Step S51).

Then, the CPU 11 decodes the barcode symbol based on the picked-up image data transferred to the RAM 13 (Step S52). The CPU 11 judges whether or not decoding thereof succeeds (Step S53).

When it is judged that decoding thereof succeeds (Step S53; YES), the CPU 11 returns the processing to the decoding control processing.

On the other hand, when it is judged that decoding thereof does not succeed (Step S53; NO), the CPU 11 judges whether or not the set execution time Ta elapses (Step S54). When it is judged that the execution time Ta elapses (Step S54; YES), the CPU 11 ends the laser focus control processing, and returns the processing to the decoding control processing. On the other hand, when it is judged that the execution time Ta does not elapse yet (Step S54; NO), the CPU 11 returns the processing to Step S41, and repeats the laser focus control processing.

Figure 10:
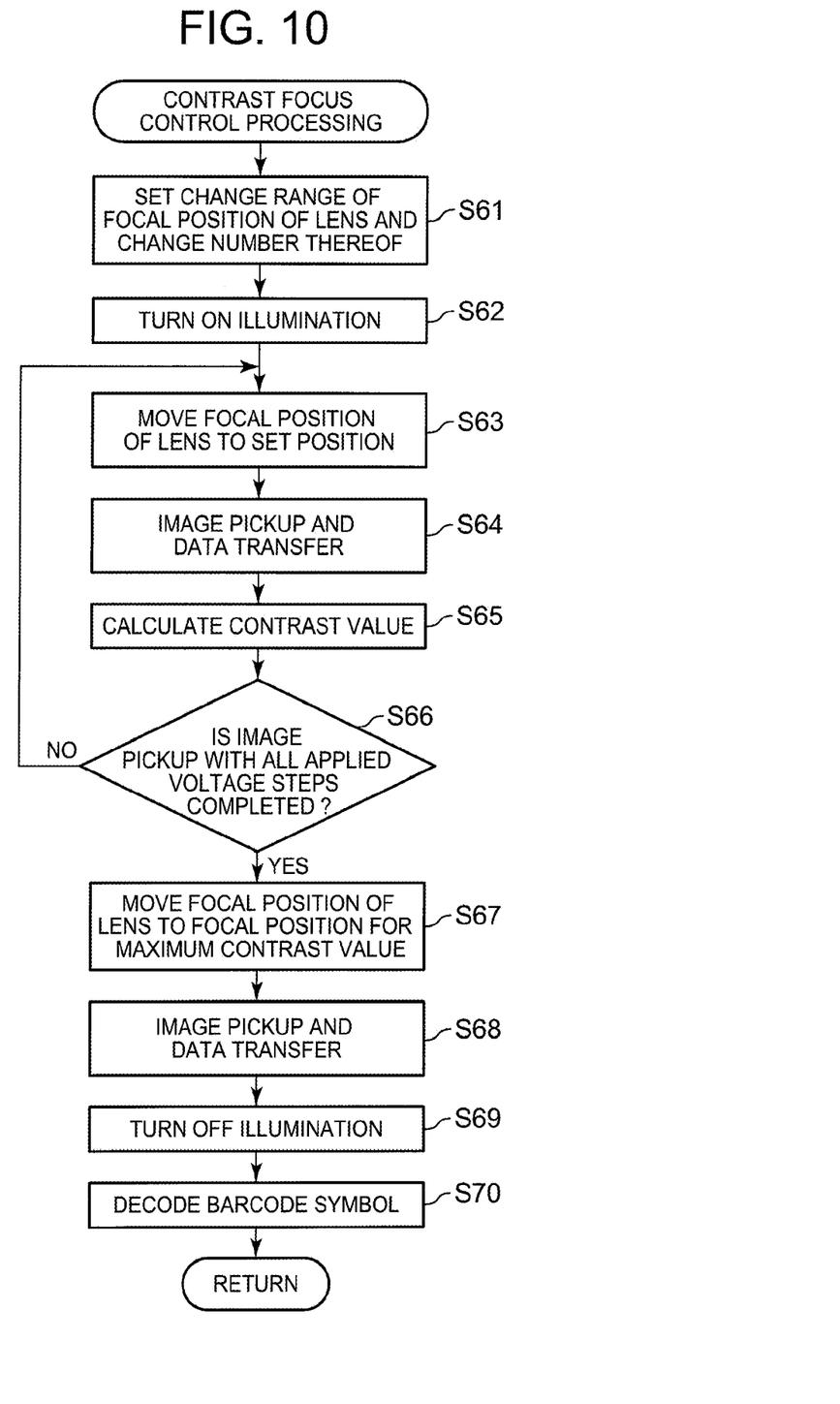
FIG. 10 is a flowchart showing control steps of decoding processing using a contrast focus method (contrast focus control processing) in the decoding control processing.

FIG. 10 is a flowchart showing control steps of the contrast focus processing (contrast focus control processing) called and executed at Step S19.

When the contrast focus control processing starts, the CPU 11 sets a change range of the focal position of the variable focal lens 212 and a change number thereof (Step S61). More specifically, the CPU 11 sets a change range in which the applied voltage is changeable and the number of changes/steps (change number) of the applied voltage, based on an applied voltage for the focal position calculated by the latest focus processing and based on the execution time Tb for the focus adjustment in the contrast focus control processing.

The CPU 11 transmits a command to the imager controller 19 to turn on the illumination 215 (Step S62). Next, the CPU 11 transmits a command to the imager controller 19 to operate the focus mechanism 213 to change the focal position of the variable focal lens 212 to a set position within the change range set at Step S61 (Step S63).

The CPU 11 transmits a command to the imager controller 19 to make the imager 211 pick up an image, and to make the imager controller 19 transfer the picked-up image data, which is transmitted from the imager 211 to the imager controller 19, to the RAM 13 by DMA (Step S64). Then, the CPU 11 calculates a contrast value of a predetermined region of the picked-up image data transferred to the RAM 13 (Step S65).

Next, the CPU 11 judges whether or not all the applied voltages (applied voltage steps) set at Step S61 are set, and image pickup with all the applied voltage steps is completed (Step S66). When it is judged that image pickup with all the applied voltage steps is not completed yet (Step S66; NO), the CPU 11 returns the processing to Step S63, and repeats Steps S63 to S66 using the next applied voltage step. On the other hand, when it is judged that image pickup with all the applied voltage steps is completed (Step S66; YES), the CPU 11 moves the processing to Step S67.

The CPU 11 selects a focal position with which the maximum contrast value is obtained from among the contrast values in the picked-up image data obtained with the calculated focal positions, and transmits a command to the imager controller 19 to move the focal position of the variable focal lens 212 to the selected focal position (Step S67). Next, the CPU 11 transmits a command to the imager controller 19 to make the imager 211 pick up an image, and to make the imager controller 19 transfer the picked-up image data to the RAM 13 by DMA (Step S68). Then, the CPU 11 transmits a command to the imager controller 19 to turn off the illumination 215 (Step S69).

Then, the CPU 11 decodes the barcode symbol based on the picked-up image data transferred to the RAM 13 (Step S70). When the CPU 11 ends decoding of the symbol, the CPU 11 ends the contrast focus control processing, and returns the processing to the decoding control processing.

As described above, the code reading apparatus 1 in the embodiment uses both the laser focus method and the contrast focus method. With the laser focus method, focus adjustment is executed by repeating, within the execution time Ta, focus setting to move the focal position based on the coordinates of the bright point in image data, the bright point being formed by the laser light beam emitted from the aimer 214 in a plane including a code symbol. With the contrast focus method, focus adjustment is executed by operating the focus mechanism 213 to change the focal position within the execution time Tb, calculating a contrast value with respect to image data obtained with each changed focal position, and moving the focal position of the variable focal lens 212 to the focal position with which the maximum (local maximum) contrast value is obtained.

The code reading apparatus 1 counts the laser focus processing execution number and the contrast focus processing execution number independently of each other, and as the execution numbers increases, the execution times Ta and Tb are respectively shortened. Accordingly, from their respective second-time focus adjustment, the focus adjustment can be executed with shorter period of time.

In addition, the initial set times for the laser focus processing and the contrast focus processing which are greatly different in required time are independently determined, and their execution times are independently shortened. Accordingly, even when the high-accuracy contrast focus processing is executed as the second focus processing, namely, after the laser focus processing is executed, the contrast focus processing is not forced to be executed within a shorter period of time than its required period of time by being influenced by the laser focus processing. Also, an unnecessarily long execution time is not set to the laser focus processing. Therefore, a code symbol can be brought into focus efficiently and accurately.

Furthermore, the code reading apparatus 1 repeats the focus adjustment and the code symbol reading in the laser focus processing alternately. Accordingly, the focal position can be adjusted asymptotically. In addition, the laser focus processing can be ended at the time when the code symbol reading succeeds.

Furthermore, the code reading apparatus 1 executes the laser focus processing and the contrast focus processing alternately when code symbol reading does not succeed. Accordingly, the code symbol reading can be executed by efficiently finding the focal position by making up for each other's weaknesses.

In the embodiment, the laser focus processing and the contrast focus processing are executed alternately. However, it is possible that one of or each of the laser focus processing and the contrast focus processing is executed a plurality of times in succession before moving to the other focus processing. In this case, a continuous execution number indicating the number of times that the laser focus processing or the contrast focus processing is executed in succession is used. Furthermore, the order of the laser focus processing and the contrast focus processing may be reversed.

The code reading apparatus 1 can adjust the continuous execution numbers for the laser focus processing and the contrast focus processing as needed. Accordingly, code symbol reading can be accurately executed by making the most of strength of the laser focus processing, which is that accuracy to some extent can be obtained within a short period of time, and strength of the contrast focus processing, which is that the focus adjustment can be executed with high accuracy at the end.

Furthermore, the code reading apparatus 1 makes the CPU 11 execute the code symbol reading by transferring the image data obtained by the imager 211 to the RAM 13. Accordingly, the configuration of the imager controller 19 can be simplified. In addition, the code reading apparatus 1 makes the image data transferred from the imager 211 to the RAM 13 by DMA. Accordingly, the code symbol reading can be executed promptly.

In particular, the code reading apparatus 1 makes only data which is necessary for the focus adjustment or the code symbol reading transferred from the imager 211 to the RAM 13. Accordingly, the data transfer time can be further shortened, and hence the code symbol reading can be speeded up.

Furthermore, the code reading apparatus 1 executes the laser focus processing and the contrast focus processing by determining the focal position based on the result of the previous focus setting or focus adjustment, when the focus adjustment is repeated multiple times. Accordingly, the accuracy of the focal position can be increased asymptotically and efficiently.

Furthermore, the code reading apparatus 1 uses a liquid lens as the variable focal lens 212. Accordingly, when the contrast focus processing is executed in particular, the focal position can be moved to numerous positions at high-speed only by changing the applied voltage.

Furthermore, the code reading apparatus 1 includes an illumination which illuminates a code symbol as a subject. Accordingly, even at a dark place or a shaded place, the code symbol reading can be accurately executed without being influenced thereby.

The present invention is not limited to the embodiment, and hence can be modified variously.

For example, in the embodiment, the CPU 11 detects the bright point formed by the aimer 214 based on the picked-up image data transferred to the RAM 13 by DMA, identifies the focal position based on the coordinates of the bright point, calculates the contrast value, and decodes a barcode symbol. However, it is possible that the imager controller 19 has these functions installed on an ASIC substrate so as to execute the functions by mathematical operation with hardware.

In the embodiment, in the contrast focus control processing, after the maximum contrast value is found, the illumination 215 is turned on, and then image data is obtained at the focal position therefor. However, it is possible that while the illumination 215 is on, processing to obtain the contrast value, and code symbol decoding using each image data are executed in parallel.

Furthermore, in the embodiment, after a series of processing for focus adjustment is ended in the laser focus processing or in the contrast focus processing, whether or not a set execution time has elapsed is judged, and accordingly whether or not to repeat same processing is judged. However, it is possible that the processing is ended halfway by an interrupt signal when its execution time has elapsed. Alternatively, whether or not to repeat same processing may be determined before its execution time elapses, based on whether or not the execution time is exceeded if the processing is repeated.

Furthermore, in the embodiment, with respect to the laser focus processing, the execution time is set as the time for all the focus adjustment, capture and decoding, and with respect to the contrast focus processing, the execution time is set as the time for only the focus adjustment. However, it is possible that with respect to the laser focus processing, the execution time is set as time for only the focus adjustment. Furthermore, it is possible that with respect to the contrast focus processing, the execution time is set as time including time for the capture and decoding.

Furthermore, in the embodiment, the execution times Ta and Tb for the focus adjustment are shortened with a linear function. However, the execution times Ta and Tb may be shortened with an optional pattern such as a quadratic function or an exponential function.

Furthermore, in the embodiment, as the variable focal lens, a liquid lens and a fixed lens, for example, using glass, are used. However, this is not a limit. For example, a variable focal lens using KTN (potassium tantalate niobate; $KTa_{1-x}Nb_xO_3$) which is a kind of the "electro-optic crystal", the reflective index of which is changed by an applied voltage, can be used too.

Furthermore, in the embodiment, as a computer readable medium storing programs of the present invention, namely, a computer program product of the present invention, the storage section 15 (for example, a flash memory, an EEPROM, a hard disk, or a ROM) is used. However this is not a limit. Other than these, a portable recording medium such as a CD-ROM can be used. Furthermore, as a medium to provide data of the programs via a communication line, a carrier wave can be used.

Furthermore, in the embodiment, the decoding processing is ended at the time when it is judged that the code symbol reading (decoding) succeeds. However, when the reading (decoding) accuracy is low or the like, the decoding processing may be continued until the reading accuracy exceeds a predetermined reference level or until it is judged that the code symbol reading succeeds twice.

Furthermore, the details, such as the numeral values, the order of steps of control or the like, can be appropriately modified without departing from the scope of the present invention.

Several embodiments of the present invention are described above. However, the scope of the present invention is not limited thereto. The scope of the present invention is the scope of claims attached below including their equivalences.

This application is based upon and claims the benefit of priority under 35 USC 119 of Japanese Patent Application No. 2011-077396 filed on Mar. 31, 2011, the entire disclosure of which, including the description, claims, drawings, and abstract, is incorporated herein by reference in its entirety.

What is claimed is:

1. A code reading apparatus comprising:
   a variable focal lens;
   a focus drive section which adjusts a focal position of the variable focal lens;
   an image pickup section which obtains image data in an image pickup direction in which the variable focal lens faces;
   a light emitting section which emits a laser light beam in the image pickup direction; and
   a control section which controls an operation of each of the focus drive section, the image pickup section and the light emitting section so as to read a code symbol included in the obtained image data, the control section including:
      a first adjustment section which repeats, within a first execution time, focus setting to move the focal position based on coordinates of a bright point in the image data, the bright point being formed in a plane including the code symbol by the emitted laser light beam, so as to execute first focus adjustment;
      a second adjustment section which changes the focal position within a second execution time, and moves the focal position based on a magnitude of contrast calculated for each image data obtained by the image pickup section with each changed focal position, so as to execute second focus adjustment;
      a timer section which counts a first execution number of the first focus adjustment and a second execution number of the second focus adjustment; and
      a time setting section which sets the first execution time to be shortened starting from a predetermined first initial set time such that the first execution time is shortened as the first execution number increases, and sets the second execution time to be shortened starting from a predetermined second initial set time such that the second execution time is shortened as the second execution number increases.

2. The code reading apparatus according to claim 1, wherein when reading of the code symbol included in image data obtained by the image pickup section based on the focus setting does not succeed, the control section repeats the focus setting with the first adjustment section and reads the code symbol included in image data obtained by the image pickup section based on the focus setting, until a total execution time of the focus setting reaches the first execution time.

3. The code reading apparatus according to claim 1, wherein
   when reading of the code symbol based on the first focus adjustment does not succeed within the first execution time, the control section reads the code symbol based on the second focus adjustment, and
   when the reading of the code symbol based on the second focus adjustment does not succeed within the second execution time, the control section reads the code symbol based on the first focus adjustment.

4. The code reading apparatus according to claim 1, wherein
   when reading of the code symbol based on the first focus adjustment does not succeed when the first focus adjustment is executed for a predetermined first continuous execution number, the control section reads the code symbol based on the second focus adjustment, and
   when the reading of the code symbol based on the second focus adjustment does not succeed when the second focus adjustment is executed for a predetermined second continuous execution number, the control section reads the code symbol based on the first focus adjustment.

5. The code reading apparatus according to claim 1 further comprising: a storage section which stores the image data therein, the image data being obtained by the image pickup section, wherein
   the control section stores the obtained image data in the storage section, and reads the code symbol included in the image data.

6. The code reading apparatus according to claim 5, wherein
the control section stores image data of a predetermined portion of an image pickup available extent for the image pickup section in the storage section, and
each of the first adjustment section and the second adjustment section executes the focus adjustment based on the image data of the predetermined portion.

7. The code reading apparatus according to claim 1, wherein when a destination focal position is already found by the focus setting or the second focus adjustment, the first adjustment section adjusts the focal position of the variable focal lens to the destination focal position, and makes the image pickup section obtain image data in a state in which the laser light beam is emitted from the light emitting section thereafter, so as to execute the focus setting.

8. The code reading apparatus according to claim 1, wherein when a destination focal position is already found by the first focus adjustment or the second focus adjustment, the second adjustment section makes the image pickup section obtain image data of the code symbol with each focal position changed within the second execution time from the destination focal position backward and/or forward.

9. The code reading apparatus according to claim 1, wherein
the variable focal lens is a liquid lens, and
the second adjustment section makes the focus drive section apply a voltage to the variable focal lens on a predetermined voltage basis so as to change the focal position.

10. The code reading apparatus according to claim 1 further comprising: an illuminating section which illuminates a subject area in the image pickup direction, wherein
the control section turns on the illuminating section when executing the second focus adjustment and reading the code symbol with the second adjustment section.

11. A computer program product having a command to execute computer processing encoded, the command readable by a computer of a code reading apparatus including: a variable focal lens; a focus drive section which adjusts a focal position of the variable focal lens; an image pickup section which obtains image data in an image pickup direction in which the variable focal lens faces; a light emitting section which emits a laser light beam in the image pickup direction; and a control section which controls an operation of each of the focus drive section, the image pickup section and the light emitting section so as to read a code symbol included in the obtained image data, the computer processing comprising:
repeating, within a first execution time, focus setting to move the focal position based on coordinates of a bright point in the image data, the bright point being formed in a plane including the code symbol by the emitted laser light beam, so as to execute first focus adjustment;
changing the focal position within a second execution time, and moving the focal position based on a magnitude of contrast calculated for each image data obtained by the image pickup section with each changed focal position, so as to execute second focus adjustment;
counting a first execution number of the first focus adjustment and a second execution number of the second focus adjustment; and
setting the first execution time to be shortened starting from a predetermined first initial set time such that the first execution time is shortened as the first execution number increases, and setting the second execution time to be shortened starting from a predetermined second initial set time such that the second execution time is shortened as the second execution number increases.

\* \* \* \* \*